United States Patent [19]

Noda

[11] 4,172,566
[45] Oct. 30, 1979

[54] FISHING REEL
[75] Inventor: Hideo Noda, Sakai, Japan
[73] Assignee: Shimano Industrial Company Limited, Osaka, Japan
[21] Appl. No.: 831,964
[22] Filed: Sep. 9, 1977
[30] Foreign Application Priority Data
  Jan. 20, 1977 [JP] Japan ............................ 52-5988[U]
  Jul. 27, 1977 [JP] Japan ........................ 52-101640[U]
[51] Int. Cl.² .......................................... A01K 89/01
[52] U.S. Cl. ............................................. 242/84.2 A
[58] Field of Search ................. 242/84.2 A, 84.21 A, 242/84.2 R

[56] References Cited
U.S. PATENT DOCUMENTS

| | | | |
|---|---|---|---|
| 2,767,935 | 10/1956 | Fowler | 242/84.2 F |
| 2,828,927 | 4/1958 | Yeada | 242/84.2 A |
| 2,862,679 | 12/1958 | Denison et al. | 242/84.2 A |
| 3,222,010 | 12/1965 | Borgstrom et al. | 242/84.2 A |

FOREIGN PATENT DOCUMENTS 558986  6/1958  Canada ............................ 242/84.2 R Primary Examiner—Billy S. Taylor
Attorney, Agent, or Firm—Stevens, Davis, Miller & Mosher

[57] ABSTRACT

A fishing reel whose rotary shaft with a rotary frame extends perpendicularly with respect to a handle shaft provided on a reel body which is mounted to a fishing rod through a mounting leg so that the rotating axis of the rotary frame may be at a right angle with respect to the longitudinal direction of the fishing rod, whereby a fishing line to be drawn out from a spool approximately at a right angle toward the tip of the rod is drawn out in the relation of being bent substantially at a right angle with respect to the axis of the rotary frame; is adapted to control a fishing line guide lever on the rotary frame by means of a control plate provided thereat.

3 Claims, 9 Drawing Figures

FISHING REEL

This invention relates to a fishing reel and more particularly to a fishing reel, a so-called closed-face reel, which is mounted on a fishing rod for winding a fishing line onto a spool by operating a handle bar.

Conventionally, this kind of closed-face reel is provided with a spool for winding up the line thereon and a rotary frame of a bowl-like shape, having a line guide lever for guiding the line to be hooked therewith and wound onto the spool. The guide lever is movable radially of the rotary frame and capable of moving inwardly and outwardly of the side wall of the rotary frame so that the guide lever may hook the line therewith on an outward movement, thereby to wind up the line onto the spool through rotation of the rotary frame, while, drawing out the line desirably from the spool on an inward movement.

The aforesaid guide lever's inward and outward movements are carried out by a control lever provided at the rear of reel body, the control lever being usually handled with the thumb of the angler's hand gripping the rod.

From this, the aforesaid thumb leaves the rod while the angler handles the rod which leads to unstable rod-gripping. Thus, there have been problems in that the angler finds it hard to handle the rod for casting the rig at the line terminal accurately toward his desired place, and he cannot fully retard by thumbing the line drawn out from the spool through the rotary frame in free rotation, for casting the rig, or playing a hooked fish.

It is desirable for the angler using the reel to be able to cast the rig to his desired place and also control the reel to play a hooked fish, thereby raising his fishing taste and angling a big fish even with a thin line.

From this reason, thumbing should be able to be carried out easily and reliably for fishing.

In other words, desirable and accurate casting depends upon being able to slow down the line from being withdrawn from the spool or from being wound onto the spool. The conventional closed-face reel, however is so constructed as not to retard the line readily, reliably and desirably while being drawn out from or wound up onto the spool.

The invention has been designed to solve the aforesaid problems in the conventional reel. An object of the invention is to provide a fishing reel with which the angler can retard the line readily and reliably by thumbing as he desires while gripping the rod firmly, resulting in more fishing enjoyment, angling a big fish even with a thin line, and also in casting the rig accurately toward his desired place.

The fishing reel in accordance with the invention is so constructed that; a reel body is provided with a handle shaft and rotary shaft driven thereby, disposed at a right angle to each other; a spool and a rotary frame are disposed around the rotary shaft; and a mounting leg for mounting the reel body to the fishing rod is provided so as to have the face of a mounting seat through which the leg is attached to the rod in relation of being extending lengthwise at a right angle with respect to the axis of the rotary shaft. The reel body is mounted to the rod through the mounting leg in a relation that the rotating axis of the rotary frame is approximately perpendicular lengthwise of the rod, so that the fishing line may be drawn out from the spool toward the tip of rod, while bending at a right angle with respect to the rotating axis; and a control plate provided at the rotary frame is controlled to enable the guide lever to move inwardly and outwardly of the rotary frame side wall so that the line can be desirably retarded when drawn out from the spool.

Accordingly, the fishing reel of the invention enables the angler to control the guide lever by use of the forefinger of his hand gripping the rod, grip the rod firmly with other fingers including the thumb, and further use the thumb for retarding the line easily and reliably as he desires.

These and other objects and features of the invention will become more apparent upon a reading of the following description and appended drawings in which.

Figure 3:
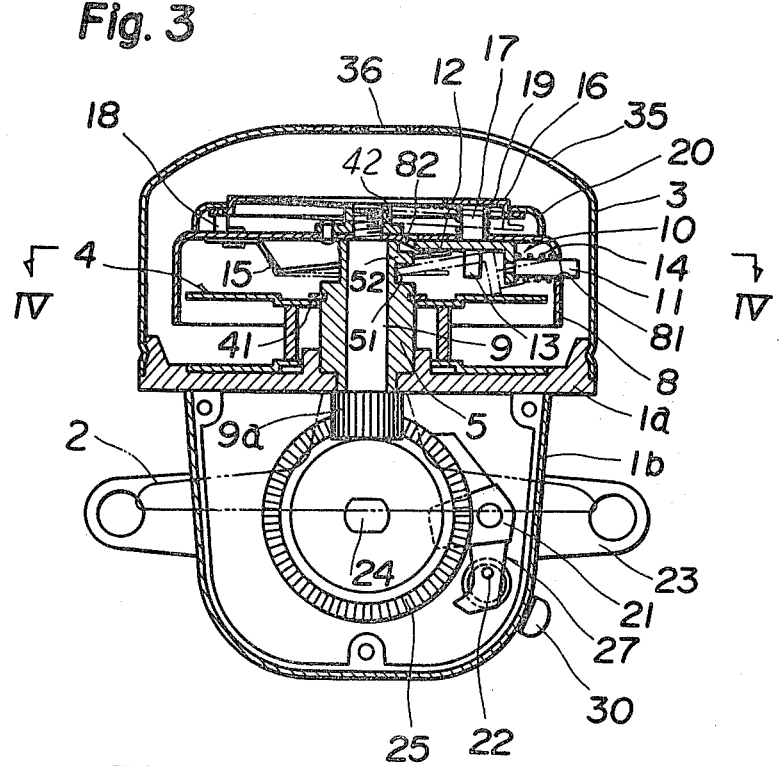
FIG. 3 is a longitudinal sectional side view of the reel.
Figure 5:
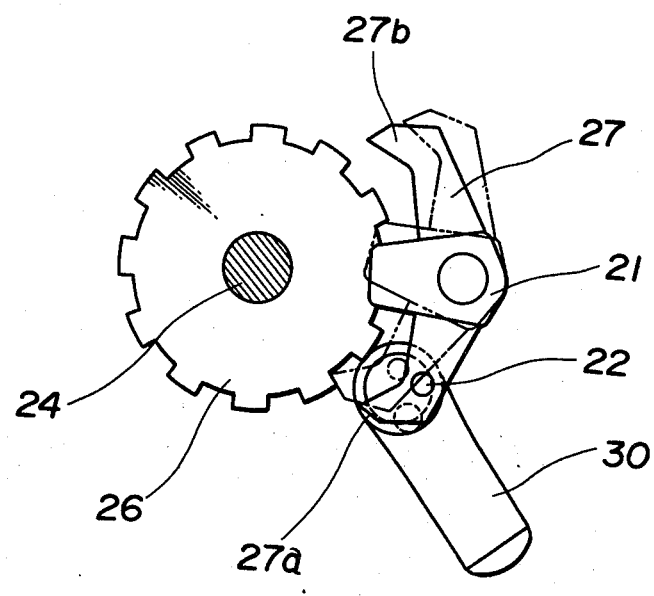
Figure 6:
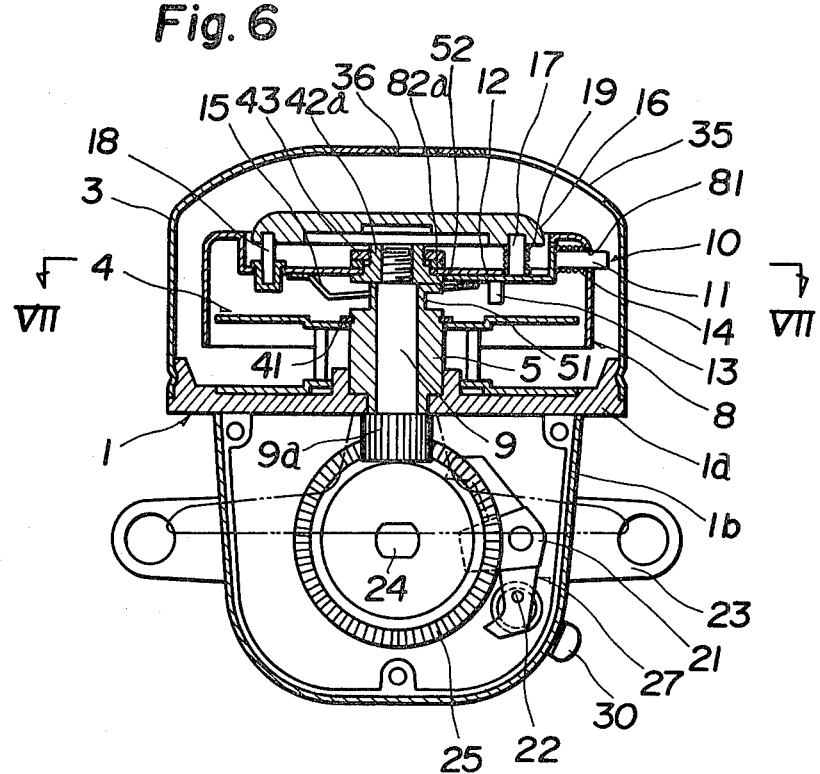
Figure 7:
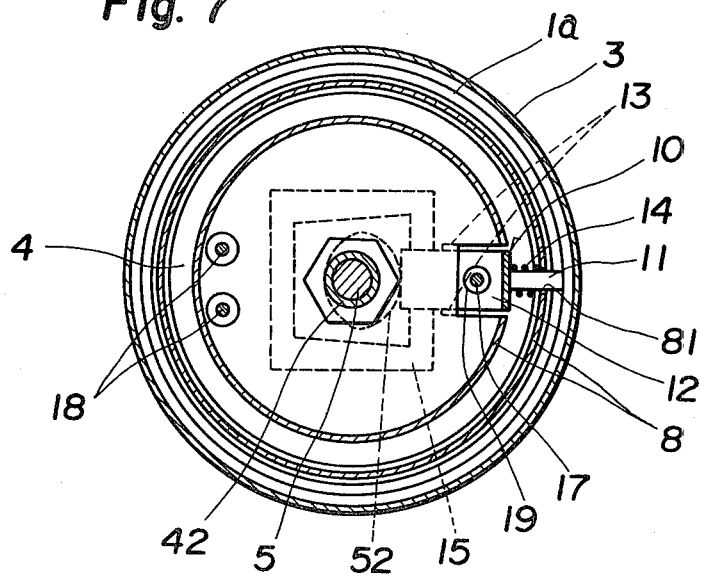
Figure 8:
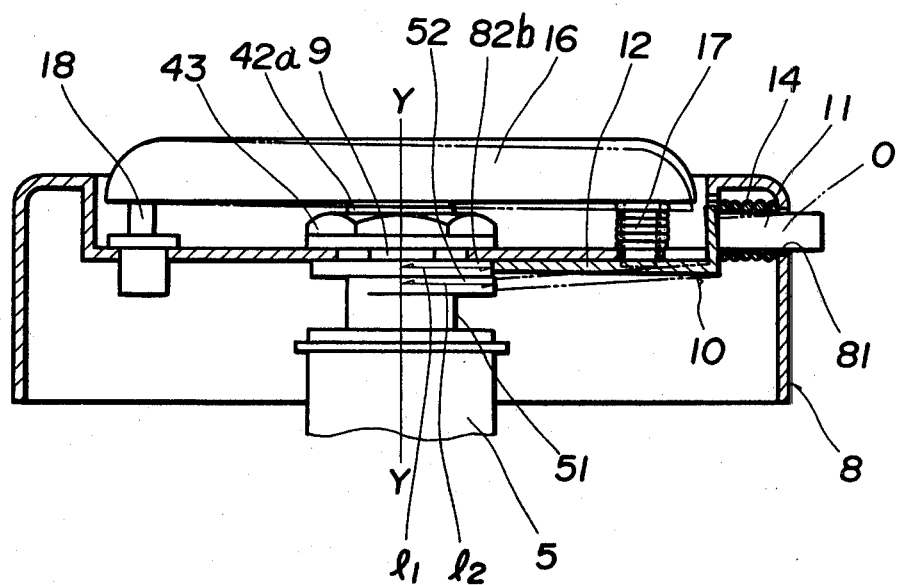
Figure 9:
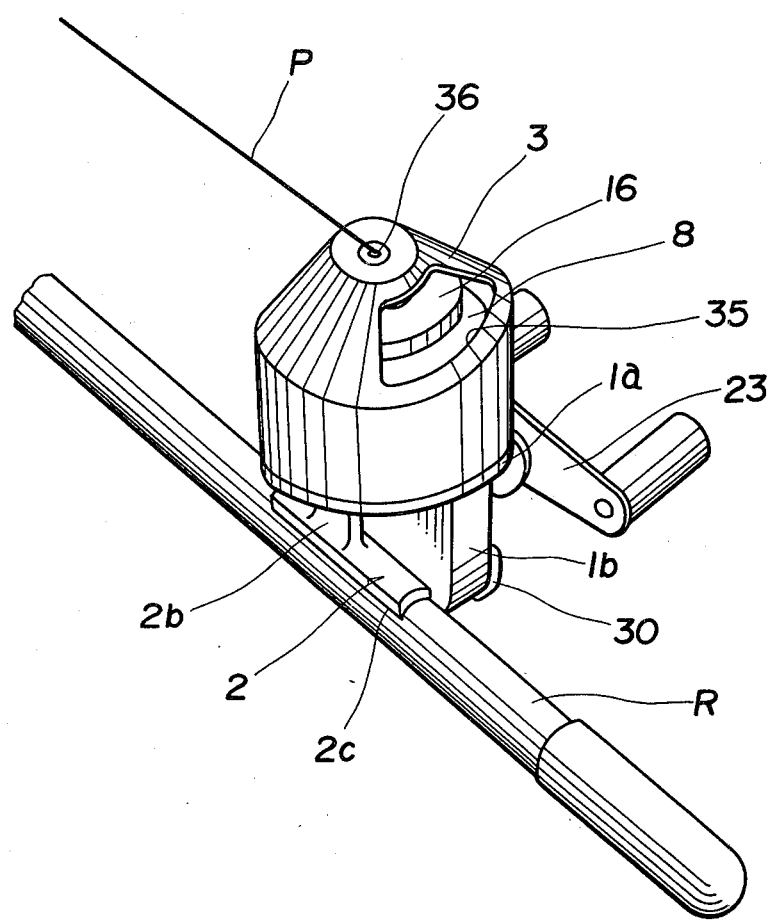

FIG. 5 is an illustration of the relation between an anti-reverse-rotation gear and pawls in mesh therewith, FIG. 6 is a longitudinal sectional side view thereof corresponding to FIG. 3 of a modified embodiment, FIG. 7 is a sectional view taken on Line VII—VII of FIG. 6, FIG. 8 is an illustration of enlarged principal portion, and FIG. 9 is a perspective view of the reel attached to the rod when in use.

Referring to FIGS. 1 through 4, there is shown a reel body 1, a mounting leg 2 for mounting the reel body 1 to a fishing rod R and a cover 3 fixed to the reel body 1.

Figure 1:
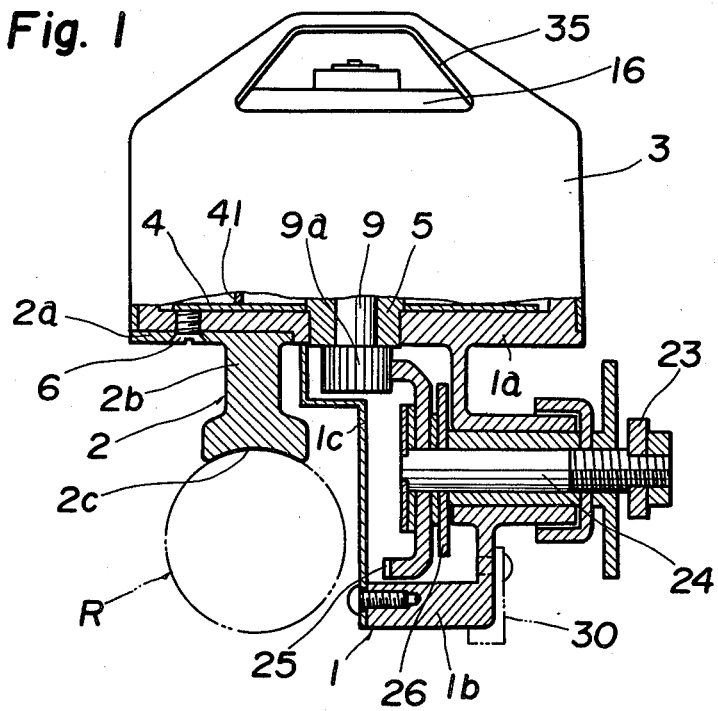
FIG. 1 is a partially cutaway front view of the reel of the invention.
Figure 2:
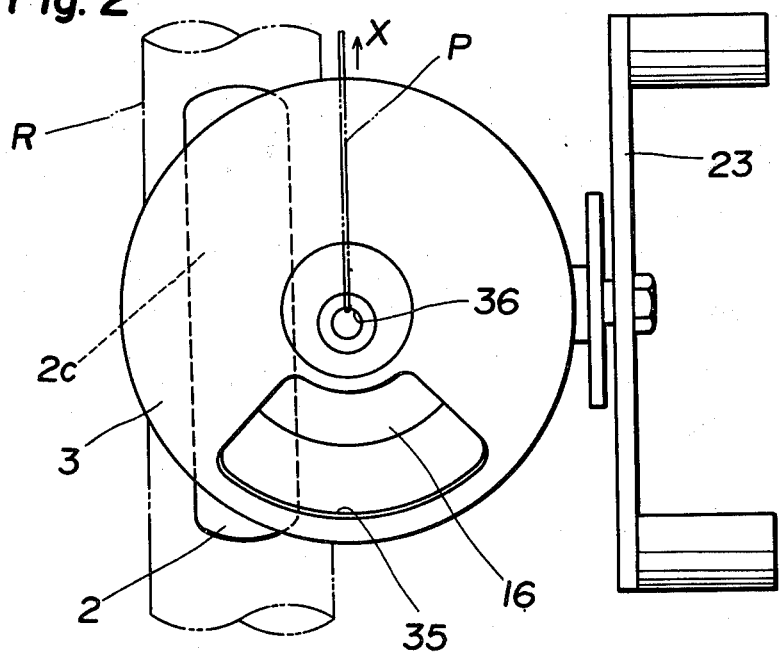
FIG. 2 is a plan view thereof.

The reel body 1 comprises, as shown in FIGS. 1 and 3, a disc 1a, a casing 1b extending perpendicularly from the flat surface of the disc 1a, and a lid 1c closing an opening of the casing 1b. The disc 1a is provided substantially at its center with a through hole to which a tubular shaft 5 is fixed. The tubular shaft 5 supports thereon a rotary shaft 9 in the relation of being rotatable and axially movable. The casing 1b supports a handle shaft 24 positioned perpendicularly to the axis of the rotary shaft 9, and houses a transmission for transmitting the rotation of the handle shaft to the rotary shaft 9.

The mounting leg 2 is provided with a fixing face 2a, a trunk 2b, and a mounting seat face 2c, through which fixing face 2a the mounting leg 2 is detachably fixed by a screw 6 to the surface of the disc 1a at one side thereof adjacent to the side wall of casing 1b. The trunk 2b extends from the fixing face 2a parallel to the axis of rotary shaft 9 and has at a free end the mounting seat face 2c of a given length lengthwise of the fishing rod R.

The mounting seat face 2c of the mounting leg 2 is positioned substantially at a right angle with respect to the axis of rotary shaft 9 so that the reel body 1 may be attached to the rod R through the mounting leg 2 in the relation that the rotating axis of rotary shaft 9 becomes perpendicular with respect to the longitudinal direction of the fishing rod R.

To the disc 1a of the reel body 1, the cover 3 is mounted for covering a spool 4 and a rotary frame 8. The cover 3, which has a through hole 36 as well-known, is mounted to the disc 1a in such a manner that the center line of the through hole 36 is made parallel to the rotating axis of rotary shaft 9 and approximately at a right angle to the fishing rod R when the reel body 1 is mounted to the rod R through the mounting leg 2. Hence, the fishing line P is drawn out toward the tip of rod R through the through hole 36 with the fishing line bent substantially at a right angle with respect to the center line of the hole 36, that is, the rotating axis of rotary frame 8.

The cover 3 is formed in a cup-like shape having a conical bottom and is detachably mounted upside down to the reel body 1. In the uppermost end of the conical bottom is provided the through hole 36 through which the fishing line passes and in the lateral side is provided a window through which the angler can insert his finger into the cover.

The spool 4, rotary frame 8, and transmission from the handle shaft 24 to the rotary shaft 9, which are housed in the reel body 1 of the reel constructed as aforegoing, will be detailed as follows:

First, the spool 4 is sleeved onto the tubular shaft 5 to be exchangeably fixed thereto by means of a snap ring 41

Second, the rotary frame 8 serves to guide the fishing line to be wound onto the spool 4, which is formed of a one-end-closed cylindrical shape like an upside-down bowl. In the bottom wall of rotary frame 8 there is formed a through hole into which the portion of the rotary shaft 9 projecting from the tubular shaft 5 is inserted. Rotary frame 8 is tightened to shaft 9 by means of a nut 42, thereby being rotatable with the rotary shaft 9.

The rotary frame 8 also has a fishing line guide lever 10 for guiding the line to be wound onto the spool 4. The guide lever 10 comprises a rod 11 and an L-like shaped plate 12. The rod 11 extends at its outer end from the side wall of rotary frame 8 through a hole 81 formed in the side wall. At the center of the bottom wall of rotary frame 8 there is provided a retaining portion 82 for retaining the inner end of guide lever 10, i.e., of the plate 12. The retaining portion 82 holds the inner end of plate 12 so as to keep the guide lever 10 projecting at its outer end from the side wall of rotary frame 8 through the through hole 81.

The guide lever 10 is movable radially of the rotary frame 8 along the bottom wall thereof through a pair of guide plates 13, and shiftable at the inner end axially of the rotary frame 8 in swinging motion around the cardinal point 0 of the insertion of the rod 11 into the through hole 81. Between the outer surface of the bent portion of plate 12 and the inner surface of the side wall of rotary frame 8 is inserted a first coil spring 14 which urges the guide lever 10 normally radially of the rotary frame 8 toward the center of rotary frame 8. On the bottom plate of rotary frame 8 there is provided a leaf spring 15 which urges the inner end of guide lever 10 axially of the rotary frame 8 toward the inner surface of the bottom wall thereof.

On the end portion of tubular shaft 5, corresponding to the inner end of guide lever 10, there are provided a recess 51 receiving therein the inner end of guide lever 10 and a cam 52 in contact with the inner end to bias the guide lever 10 from the recess 51 toward the retaining portion 82 following the rotation of rotary frame 8. The inner end of guide lever 10 enters recess 51 through the force of spring 14 when the inner end of guide lever 10 is shifted axially of the rotary frame 8 as shown in the dot-dash line in FIG. 3, by means of a control plate to be hereinafter described. At this moment the outer end of guide lever 10, i.e., the rod 11, withdraws into the side wall of rotary frame 8. While, under this condition the rotary frame 8 is rotated to allow the inner end of guide lever 10 to contact the cam 52 through the spring 15, thereby to be guided to the retaining portion 82, as shown by the solid line.

The guide lever 10 constituted as aforesaid is controlled by a control plate 16 supported to the rotary frame 8 in the relation of being movable axially thereof.

The control plate 16 is formed of a disc and provided with a pusher 17 for transmitting the movement of the control plate to the guide lever 10 in such a manner that the pusher contacts at its tip thereof the plate 12 of the guide lever 10 through a hole in the bottom wall of rotary frame 8 so that the control plate is operated to shift the guide lever 10 in a swinging motion through the pusher 17 as shown by the dot-dash line in FIG. 3. The control plate 16 also has a support pin 18 of a resilient material positioned about 180° from the pusher. The pin 18 supports the control plate in the relation of being swingable with respect to the rotary frame 8. Also, a coil spring 19 is mounted around the pusher 17 to support the control plate 16 as shown by the solid line in FIG. 3, in which a frame 20 serves as the stopper for the control plate 16.

Third, the transmission for transmitting the rotation of handle shaft 24 to the rotary frame 8 comprises a master gear 25 and a pinion 9a in mesh therewith. The master gear 25 is secured to the inner end of handle shaft 24 and the pinion 9a, to the lower end of rotary shaft 9. The handle shaft 24 has its outer end a handle bar 23 which is operated to rotate the handle shaft 24 and thereby transmit the rotation thereof to the rotary shaft 9 through the transmission, thus rotating the rotary frame 8 fixed to the rotary shaft 9.

To the handle shaft 24 is also insertably fixed an anti-reverse gear 26 for preventing reverse rotation of the line winding direction. The gear 26, as shown in FIG. 5, is meshable with each of a pair of pawls 27a and 27b of a pawl holder 27, the pawl holder being pivoted within the casing 1b. Thus, the reverse rotation of handle shaft 24 is prevented by the meshing of one of the pawls with the anti-reverse gear 26, where each pawl is selected by a control lever 30 at the casing 1b.

Also, in FIG. 5, contacts 21 are formed on the pawl holder 27 to be in contact with the anti-reverse gear 26 and a pin 22 is fixed to the pawl holder to be engageable with the control lever 30.

The fishing reel of the invention constituted as aforesaid, as shown in FIG. 9, is mounted to the fishing rod at one of four positions through the mounting leg. The four positions are selective by the angler as follows: a first position where the reel body 1 is above and the handle bar 23 at the right hand to the rod R when gripped by the angler for fishing; a second, the reel body above and the handle bar at the left hand; a third, the reel body below and the handle bar at the right hand; and a fourth the reel body below and the handle bar at the left hand.

Thus, when the angler tries to cast the rig, he inserts the forefinger of his hand gripping the fishing rod into the cover 3 through the window 35, to push the control plate 16 against the spring 19 force, thereby to move the pusher 17 toward plate 12 through the rotary frame 8. Hence, the end of pusher 17 is in contact with the guide lever 10 to be shifted in a swinging motion downwardly as shown by the dot-dash line in FIG. 3, and the inner end of guide lever 10 slides into the recess 51 by the spring 14 force to allow the outer end to withdraw into the rotary frame side wall. Thus the line is free from the guide lever hooking and guiding it and simultaneously is retained by the angler's forefinger pushing the control plate 16. While casting under these conditions, the angler removes his forefinger from the control plate 16 to allow the rig to reach the desired casting area. At this time, the line is drawn out from the spool 4 through hole 36 between the forefinger and control plate 16, and is retarded therebetween by the so-called thumbing in which the retardation is desirably adjustable with various gap widths between the finger and control plate.

On the other hand, the handle bar 23, when a fish is hooked, is manipulated to rotate the rotary frame 8 through which the fishing line is wound onto the spool 4, in which the rotary frame rotates to allow the guide lever 10 to go out from the side wall of rotary frame. In detail, the guide lever 10, whose outer end has withdrawn into the rotary frame 8 for casting as aforesaid, is urged at the inner end toward the cam 52 by the second spring 15 force due to the released control plate 16. Hence, when the handle bar 23 is operated to rotate the rotary frame 8, the guide lever 10 rotatable together therewith is guided at the inner end onto the cam 52 so as to move outwardly against the spring 14, so that the inner end again rides on the retaining tongue 82 to keep the guide lever projecting at its outer end beyond the side wall of rotary frame 8. Thereafter, the line is guided by the guide lever following rotation of the rotary frame 8, thereby being wound onto the spool 4, and thereby allowing the angler to play the fish as desired. If the hooked fish pulls the line heavily while winding, the control plate 16 is immediately pushed to release the line from the guide lever 10 so that the line may run out through hole 36 between the control plate 16 and angler's finger while being braked for playing the hooked fish. This thereby prevents the line from being cut.

As seen from the aforementioned description, the fishing reel of the closed-face type in accordance with the invention, has the control plate provided axially of the rotary frame for controlling the guide lever rotatable in cooperation with the rotary frame so as to move inwardly and outwardly thereto. The control plate is manipulatable with the forefinger of the angler's hand gripping the fishing rod.

Hence, a firm rod gripped with the angler's fingers except for the forefinger controls the guide lever and makes the casting reliable, thereby enabling the angler to cast the rig accurately toward his desired place. Also, the aforesaid construction, i.e., the guide lever is controllable by the control plate provided ahead of the rotary frame, enables the angler to brake the wound-up or drawn-out line desirably by thumbing.

In the embodiment as aforesaid, the outer end of guide lever 10 is in advance of the inner end thereof axially of the rotary frame 8, but preferably toward the control plate 16.

In this instance, if the reference $l_1$, as shown in FIG. 8, represents the length between the outer end of the retaining portion 82 and the rotating axis Y—Y of rotary frame 8 and $l_2$, the length between the maximum projecting outer end of the cam 52 and the same axis, $l_2$ is made larger than $l_1$ so as to form a stepped portion, whereby the guide lever 10 is sure to ride on the retaining portion to be engaged therewith after being guided by the cam 52. In addition, the outer end of the guide lever is displaced ahead of the inner end toward the control plate to the extent that the cardinal point 0 in its swinging motion of the inner end is located ahead of the retaining portion 82 toward the control plate 16, whereby the guide lever 10, which is shifted in its swinging motion by the control plate, can be free from contact at the inner end with the cam 52.

Figure 4:
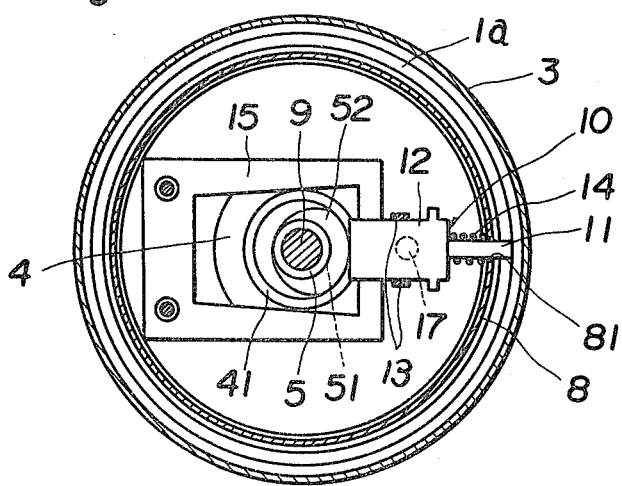
FIG. 4 is a partially omitted sectional view taken on Line IV—IV in FIG. 3.

The retaining portion 82, which is provided directly adjacent the rotary frame 8 in the embodiments shown in FIGS. 3 and 4, may be formed at the nut 42 fixed to the rotary frame 8 as shown in the embodiments in FIGS. 6 through 8, where the formation is not defined particularly. In brief, it is preferable that the retaining portion 82 is provided in the center of the rotary frame 8. In addition, in the construction shown in FIGS. 6 through 8, a lock nut 43 serves to fix the rotary frame 8 to the nut 42.

While the preferred embodiments of the invention have been described using specific terms, such description is for illustrative purpose only, and it is to be understood that changes and variations may be made without departing from the spirit or scope of the following claims.

I claim:

1. A fishing reel attached to a fishing rod and adapted to manipulate a handle bar for winding up a fishing line onto a spool, said reel comprising:

a reel body;

a mounting leg on which said reel body is attached to the fishing rod;

a spool fixed to said reel body;

a rotary frame having a peripheral hole therein and guide plates mounted thereon, a guide lever positionable through said hole and between said plates for guiding the fishing line onto said spool;

a rotary shaft supporting thereon said rotary frame and carrying a pinion;

a handle shaft carrying a gear in mesh with said pinion; and a handle bar mounted on said handle shaft to rotate said rotary shaft;

said reel body fixedly supporting thereon a tubular shaft having the axis perpendicular to the axis of said handle bar; said tubular shaft supporting thereon said rotary shaft in the relation of being rotatable thereto, and having a cam with an outer swollen portion at the outer periphery of an end of the tubular shaft; said rotary shaft projecting at an end thereof from said end of said tubular shaft so that the rotary frame is fixed to said projection; said mounting leg having a mounting seat face of a given length lengthwise of the fishing rod; said mounting seat face lengthwise extending to be substantially at a right angle with respect to the axis of said rotary shaft, so that said reel body may be attached to the fishing rod in such a manner that the rotating axis of said rotary frame extends substantially at a right angle to the longitudinal direction of the fishing rod, whereby the fishing line is drawn out from said spool toward the tip of said fishing rod in the relation of being bent substantially with respect to the axis of said rotary frame; said rotary frame being formed in a cup-like shape, and having at its center a retaining portion for engaging with said guide lever and radially therefrom a supporting pin and a control plate swingably connected to said rotary frame at said support pin; said guide lever on said rotary frame being movable radially of said rotary frame, and having an outer end capable of projecting from a side wall of said rotary frame and an inner end movable axially of said rotary frame, said guide lever being urged inwardly radially of said rotary frame by means of a first spring acting radially thereof and toward a bottom wall of said rotary frame by means of a second spring acting axially of said rotary frame, and being contactable at the inner end with said cam and retaining portion respectively, the outer end of said guide lever being disposed closer to said control plate along the axis of said rotary shaft than the inner end of said guide lever, the distance between the axis of said rotary frame and the surface of the outermost swollen portion of said cam being made greater than the distance between said axis and the outer surface of said retaining portion in contact with the inner end of said guide lever; said control plate being fixed to said rotary frame so as to control said guide lever in the relation of being movable axially of said rotary frame, and having a pusher; said pusher abutting against a substantially intermediate portion of said guide lever so as to transmit the movement of said control plate to said guide lever through the pusher, said control plate upon being depressed forcing the inner end of said guide lever to move toward said cam by means of said pusher and pivoting around a point located axially closer to said control plate than said retaining portion of the rotary frame.

2. The fishing reel according to claim 1, wherein said control plate is formed in a disc-like shape and has a support pin positioned 180° from said pusher, thereby being swingably supported to said rotary frame through said pin.

3. The fishing reel according to claim 1, wherein said reel body is provided with a cover of a cup-like shape for covering therewith said spool, rotary frame and control plate, said cover being provided at one end with a through hole through which the fishing line passes and at a lateral side thereof with a window through which said control plate is operable.

* * * * *